United States Patent
Kawai et al.

(10) Patent No.: US 7,820,217 B2
(45) Date of Patent: Oct. 26, 2010

(54) CONDITIONING AGENT FOR FRY FOOD

(75) Inventors: Takanori Kawai, Yokkaichi (JP); Keiichi Miyamoto, Yokkaichi (JP); Hiromichi Kouno, Yokkaichi (JP); Takashi Hagi, Yokkaichi (JP)

(73) Assignee: Taiyo Kagaku Co., Ltd., Yokkaichi-Shi, Mie (JP)

( * ) Notice: Subject to any disclaimer, the term of this patent is extended or adjusted under 35 U.S.C. 154(b) by 665 days.

(21) Appl. No.: 10/565,383

(22) PCT Filed: Jul. 24, 2003

(86) PCT No.: PCT/JP03/09362

§ 371 (c)(1), (2), (4) Date: Jan. 23, 2006

(87) PCT Pub. No.: WO2005/009142

PCT Pub. Date: Feb. 3, 2005

(65) Prior Publication Data

US 2006/0182853 A1    Aug. 17, 2006

(51) Int. Cl.
*A23L 1/00* (2006.01)

(52) U.S. Cl. .................................................... 426/291

(58) Field of Classification Search ................... 426/291
See application file for complete search history.

(56) References Cited

U.S. PATENT DOCUMENTS

| 6,025,007 A | * | 2/2000 | Krawczyk | 426/573 |
| 2002/0001659 A1 | | 1/2002 | Takahashi et al. | |

FOREIGN PATENT DOCUMENTS

| EP | 1010370 A2 | 6/2000 |
| JP | 05-328914 | 12/1993 |
| JP | 08-154610 | 6/1996 |
| JP | 2000-236821 | 9/2000 |
| JP | 2002-017284 | 1/2002 |
| JP | 2002-315527 | 10/2002 |
| JP | 2002291433 | * 10/2002 |
| JP | 2003-23987 A | 1/2003 |

* cited by examiner

*Primary Examiner*—Keith D Hendricks
*Assistant Examiner*—Jyoti Chawla
(74) *Attorney, Agent, or Firm*—Birch, Stewart, Kolasch & Birch, LLP

(57) ABSTRACT

The present invention relates to a quality improver for a deep-fried food, characterized in that the quality improver comprises a polysaccharide powder having an average particle size of 20 μm or less; a frying powder and a frying food comprising the quality improver; and a deep-fried food prepared by cooking using the quality improver or the frying powder.

14 Claims, No Drawings

CONDITIONING AGENT FOR FRY FOOD

TECHNICAL FIELD

The present invention relates to a quality improver for a deep-fried food. In addition, the present invention relates to a frying powder and a frying food, each comprising the improver; and a deep-fried food prepared by cooking using the improver or the frying powder.

BACKGROUND ART

Deep-fried foods such as various deep-fried foods such as tempura, deep fries with batter, deep-fries without batter but simply dipped in seasoned sauce, and deep-fried potatoes; various deep-fried breads such as doughnuts and curry-stuffed deep-fried breads; various deep-fried noodles such as instant noodles, SARA UDON (deep-fried noodles with a seafood sauce), stir-fried noodles, and longevity noodles; or the like have been manufactured by frying in an edible oil. In the deep-fried foods as mentioned above, when have a large oil absorption during the frying, their mouthfeel and taste are lowered. In addition, in recent years more people have been striving to maintain their health on a daily basis, and they are more likely to watch on their diet and try to control the ingestion of oil, whereby a tendency for desiring a deep-fried food having a controlled oil absorption is becoming stronger.

As a method for controlling an oil absorption in the deep-fried food, there have been many proposals such as a method comprising adding an emulsifying agent at least a part of which is in the state of liquid crystal or α-crystal gel to a deep-fried food (Japanese Patent Laid-Open No. Hei 5-328914); a method comprising adding an alginic acid ester to an oil cooking food (Japanese Patent Laid-Open No. 2000-236821); a method comprising combining a soluble starch of which 10% by weight solution has a viscosity of 300 cps or less, together with a high-viscosity starch, to be used a battering material for a deep-fried food (Japanese Patent Laid-Open No. Hei 8-154610); and the like. However, a satisfactory effect has not been obtained. In addition, although addition of a polysaccharide to a deep-fried food has been known (see, for example, Japanese Patent Laid-Open Nos. 2002-017284 and 2002-315527), conventionally used polysaccharides are composed of coarse particles (average particle size: 50 to 100 µm or so). Moreover, their particles are likely to be aggregated to each other, so that their dispersibility is poor in a dough or a batter. Accordingly, a satisfactory effect has not been obtained.

DISCLOSURE OF INVENTION

An object of the present invention is to provide a quality improver for a deep-fried food, capable of controlling an oil absorption of the deep-fried food during cooking, thereby making it possible to provide a deep-fried food having excellent mouthfeel and taste without being oily; a frying powder and a frying food, each comprising the improver; and a deep-fried food prepared by cooking using the improver or the frying powder.

As a result of intensive studies in view of solving the above-mentioned problem, the present inventors have found that when a polysaccharide powder having an average particle size of 20 µm or less is used when cooking a deep-fried food, surprisingly, the oil absorption of the deep-fried food during the cooking is remarkably controlled. The present invention has been perfected thereby.

Specifically, the present invention relates to:

[1] a quality improver for a deep-fried food, characterized in that the quality improver comprises a polysaccharide powder having an average particle size of 20 µm or less;

[2] the quality improver for the deep-fried food according to the above [1], wherein the polysaccharide powder is obtained by subjecting a polysaccharide to jet pulverization or freeze pulverization;

[3] the quality improver for the deep-fried food according to the above [1] or [2] wherein the polysaccharide is alginic acid and/or pectin;

[4] a frying powder comprising the quality improver for a deep-fried food as defined in any one of the above [1] to [3]

[5] a frying food comprising the quality improver for the deep-fried food as defined in any one of the above [1] to [3]; and

[6] a deep-fried food prepared by cooking using the quality improver for the deep-fried food as defined in any one of the above [1] to [3], or the frying powder as defined in the above [4].

BEST MODE FOR CARRYING OUT THE INVENTION

One of the great features of the quality improver for a deep-fried food of the present invention (hereinafter referred to as "improver") resides in that the improver comprises a polysaccharide powder having an average particle size of 20 µm or less.

Although the details of the mechanism for exhibiting the effect of controlling the oil absorption of the deep-fried food during the cooking using the polysaccharide powder have not been elucidated, it is deduced that in addition to the properties of the powder itself, a low aggregability of the powder and capability of exhibiting an excellent dispersibility when mixed in a dough, batter (frying powder), or the like greatly contributes to the exhibition of the above-mentioned effect.

The term "frying food" as used herein refers to a food intended for fry cooking, which is the one before being subjected to frying; and the term "deep-fried food" as used herein refers to a food which has already been subjected to fry cooking.

The kind of the polysaccharide of the present invention is not particularly limited, and any kinds may be used as long as the polysaccharide can constitute a powder having an average particle size of 20 µm or less. In addition, each particle of the powder may be constituted by one or more kinds of polysaccharides. The powder itself may also be constituted by one or more kinds of polysaccharides. Moreover, the molecular weight of the polysaccharide is not particularly limited, and is usually from 10,000 to 1,000,000, and preferably from 10,000 to 400,000 or so.

Specifically, the polysaccharide used in the present invention includes a substance used as a thickening stabilizer in the field of food products and a decomposed product thereof; and starch or a processed product thereof and decomposed products thereof.

The above-mentioned substance used as a thickening stabilizer and a decomposed product thereof are not particularly limited, and include, for example, xanthane gum, guar gum, tamarind gum, locust bean gum, carrageenan, pectin, glucomannan, alginic acid, curdlan, gum arabic, karaya gum, gum ghatti, psyllium seed gum, gellan gum, tara gum, pullulan, and decomposed products thereof; and further, sodium alginate, alginic acid ester of propylene glycol, carboxymethyl cellulose (CMC), sodium polyacrylate, methyl cellulose, soybean polysaccharide; and the like. From the viewpoint of an excellent effect of controlling oil absorption, guar gum, pectin, locust bean gum, xanthane gum, tamarind gum, alginic acid, curdlan, and decomposed products thereof; sodium alginate, alginic acid ester of propylene glycol, and CMC are preferable, and guar gum, pectin, xanthane gum, alginic acid, sodium alginate, alginic acid ester of propylene glycol, and CMC are more preferable.

The above-mentioned starch or a processed product thereof and decomposed products thereof are not particularly limited, and include, for example, tapioca, potato starch, cornstarch, waxy corn starch, rice starch, wheat starch, sweet potato starch, coconut starch, and the like, or processed products thereof, and decomposed products thereof. Among them, tapioca, potato starch, cornstarch, waxy corn starch, rice starch, and wheat starch, or processed products thereof, and decomposed products thereof are preferable, from the same viewpoint as above.

Among the polysaccharides described above, alginic acid and/or pectin is especially preferable, and alginic acid is most preferable, from the viewpoint of being especially effective in exhibiting the desired effects of the present invention.

Each of the above-mentioned substances specifically exemplified as the polysaccharide of the present invention can be used alone or in admixture of two or more kinds.

In the present invention, the polysaccharide powder having an average particle size of 20 µm or less is used. However, when the average particle size of the polysaccharide to be used exceeds 20 µm, a powder obtained by properly pulverizing the polysaccharide by a known method as exemplified below is used.

The method for pulverizing a polysaccharide is not particularly limited, as long as the method allows the polysaccharide to be formed into fine powders so as to have an average particle size of 20 µm or less. The method includes, for example, a dry-pulverization method with a ball-mill, a jet mill (jet pulverization), and the like; or a freeze pulverization method by using a liquid nitrogen; and the like. As the method for pulverizing a polysaccharide, a jet pulverization method (with a jet-mill) or a freeze pulverization method is preferable, from the viewpoint that the polysaccharide is easily formed into a powder having the desired average particle size, and that an impact heat is less likely to be generated during the pulverization, so that a random, denaturing action would not be caused to the polysaccharide powder. Therefore, as the polysaccharide powder used in the present invention, the powder obtained by subjecting the polysaccharide to jet pulverization or freeze pulverization is preferable. The powder has a low aggregability, and for example, when mixed with a frying powder or the like, the powder can exhibit an especially excellent dispersibility.

As the method of forming a polysaccharide into fine powders so as to have an average particle size of 20 µm or less, a method comprising classifying the polysaccharide with a sieve can be used. However, the method for pulverizing the polysaccharide by physical impact as exemplified above is preferable, from the viewpoint of lowering the aggregability of the polysaccharide powder.

The jet pulverization method mentioned above is a method comprising accelerating a raw material of a powder and granular material to be pulverized with a compressed air or an inert gas such as nitrogen at a high speed, and allowing the raw materials to collide with each other or against a collision plate or the like separately provided (see, for example, *Shigen Shori Gijutu* (*Technique for Resource Treatment*), Mitsuo MIYAJI, Vol. 35, No. 4, p. 36-41). The model of the jet mill is not limited. The general model of the jet mill includes a model comprising acceleration tubes for accelerating and jetting raw materials, each tube being arranged facing each other to allow the raw materials to collide with each other; a model in which raw materials jetted from an acceleration tube are collided against a collision plate or the like; a model comprising an acceleration tube positioned so that the tube is inserted into a vessel where raw materials are circulated; and the like. According to the jet pulverization methods, there are some advantages such that a mechanical stress such as impact, shearing, compression, and grinding with a pulverizing cutter, a compression roller, or the like is not applied to the raw material, and that use of a gas produces a cooling effect, so that the raw material has a low heat generation, and that the polysaccharide does not thermally undergo denature or oxidation, whereby the polysaccharide can be pulverized as a raw material.

On the other hand, the freeze pulverization method is a method comprising cooling a raw material at a low temperature to freeze, and pulverizing the raw material in a frozen state (see, for example, *Shokuhin to Kagaku* (*Foods and Sciences*), Nobuhide Hagiwara, Vol. 21, No. 6, p. 98-101). The conditions for the freeze pulverization may be such conditions that a polysaccharide is previously cooled with a liquid nitrogen, and the cooled polysaccharide is pulverized so that a finally obtained powder has an average particle size of 20 µm or less. The kinds, types, or the like of the pulverizer to be used for the freeze pulverization are not limited. The reason for using a liquid nitrogen for previous cooling is that the temperature of the liquid nitrogen is a very low temperature of −(minus)196° C.; therefore, when the liquid nitrogen is used as a coolant, the liquid nitrogen has some advantages such that a polysaccharide can be frozen within a very short period of time, whereby the denaturation due to the freezing hardly occurs, and that an impact heat to be generated with a pulverizer such as a hammer-mill is not generated, whereby non-oxidative pulverization can be carried out. The cooling system may be in any process such as an immersion process or a distribution process. In addition, it is preferable that the pulverization temperature is from −100° to −50° C., from the viewpoint of excellent economic advantages and pulverization efficiency, and easy control of the average particle size of the powder.

The polysaccharide powder used in the present invention may be one having an average particle size of 20 µm or less. The polysaccharide powder has an average particle size of preferably 15 µm or less, and more preferably 10 µm or less. From the industrial viewpoint, it is preferable that the polysaccharide powder has an average particle size of 1 µm or more. Therefore, the polysaccharide powder of the present invention has an average particle size of preferably from 1 to 20 µm, more preferably from 1 to 15 µm, and even more preferably from 1 to 10 µm.

In the present invention, the average particle size of the polysaccharide powder can be determined with, for example, a laser diffraction particle size analyzer (manufactured by Japan Laser Corporation). In addition, it is preferable that the particle size distribution of the powder is a normal distribution or a nearly normal distribution.

Besides the polysaccharide powder, other components as listed below may be contained in the improver of the present invention as desired. Other components include various components which are generally used for improving quality of the deep-fried food. These components are not particularly limited, and preferably include egg white, egg white hydrolysates, egg yolk, egg yolk hydrolysates, chicken egg (whole egg), chicken egg hydrolysates, whey protein, casein, casein sodium, lacto protein, collagen, gelatin, plasma protein, wheat protein, glutenin, gliadin, soy protein, pea protein, fatty acid esters of glycerol, organic acid esters of monoglycerides, fatty acid esters of polyglycerol, condensed ricinoleic acid esters of polyglycerol, fatty acid esters of sorbitan, fatty acid esters of propylene glycol, fatty acid esters of sucrose, stearoyl calcium lactate, lecithin, enzymatically treated lecithin, enzymatically decomposed lecithin, a powdered animal fat or oil obtained by emulsifying an animal fat or oil such as beef tallow or lard, having a melting point of 20° C. or more, into an O/W type emulsion with an emulsifying and coating agent, and thereafter spray-drying the emulsion (see, for example, *New Food Ind.*, Ryota Katahira, Vol. 24, No. 11, p. 5-8), a powdered vegetable fat or oil or the like obtained by emulsifying a vegetable fat or oil such as palm oil, coconut oil, soybean oil, or cottonseed oil into an O/W type emulsion with an emulsifying and coating agent, and thereafter spray-drying the emulsion (see, for example, *Syokuhin to Kagaku* (*Foods and Sciences*), Tatsuro Tanaka, Takao Ota, Youhachi Uemura, Yukito Hibi, vol. 31, No. 10, p. 118-124), and an enzyme selected from amylase, cellulase, hemicellulase, glucose oxidase, and transglutaminase, and the like. More preferably included are egg white, egg white hydrolysates, egg yolk, egg yolk hydrolysates, chicken egg (whole egg), chicken egg hydrolysates, whey protein, wheat protein, gliadin, fatty acid esters of glycerol, enzymatically decomposed lecithin, a powdered animal fat or oil obtained by emulsifying beef tallow or lard having a melting point of 20° C. or more into an O/W type emulsion with an emulsifying and coating agent, and thereafter spray-drying the emulsion, and a powdered vegetable fat or oil obtained by emulsifying palm oil, coconut oil, or soybean oil into an O/W type emulsion with an emulsifying and coating agent, and thereafter spray-drying the emulsion. These other components can be used alone or in admixture of two or more kinds.

The improver of the present invention may be composed of a polysaccharide powder itself or a mixture of a polysaccharide powder and the other components mentioned above. This improver can be prepared, for example, by properly pulverizing one kind of a polysaccharide or a mixture of two or more kinds of polysaccharides according to the method exemplified above so as to give a powder having a given average particle size. If available, a polysaccharide powder having an average particle size of 20 μm or less can be used without being subjected to pulverization. When the improver is composed of the mixture of the polysaccharide powder and the other components mentioned above, the improver can be prepared by mixing the resulting polysaccharide powder with the other components, or previously mixing a polysaccharide with the other components prior to formation of fine powders, and pulverizing the polysaccharide in the presence of the other components.

The improver of the present invention can be used by, for example, (i) blending the improver in a frying powder to be used for cooking of a deep-fried food, or (ii) kneading the improver into a frying food. The content of the polysaccharide powder in the improver of the present invention cannot be absolutely determined since the content depends on the amount of the improver used for cooking of a deep-fried food. Usually, in the embodiment (i), the content is preferably from 0.01 to 10% by weight, and more preferably from 0.1 to 5% by weight; and in the embodiment (ii), the content is preferably from 0.01 to 10% by weight, and more preferably from 0.1 to 5% by weight. In the embodiment (i), the improver is blended in an amount of preferably from 0.01 to 10% by weight, and more preferably from 0.1 to 5% by weight of the frying powder. In the embodiment (ii), the improver is blended in an amount of preferably from 0.01 to 10% by weight, and more preferably from 0.1 to 5% by weight of the frying food.

As described above, the improver of the present invention is obtained, and when the improver is used for cooking of a deep-fried food, the oil absorption of the deep-fried food is remarkably controlled, whereby a deep-fried food having excellent mouthfeel and taste without being oily is obtained. The improver of the present invention functions as an agent for controlling the oil absorption of the deep-fried food as described above. It is preferable that the improver of the present invention is usually used or preserved in the form of a powder.

In addition, one embodiment of the present invention provides a frying powder for cooking of a deep-fried food comprising the improver of the present invention. The frying powder has the same constitution as that of a conventional frying powder except that the frying powder comprises the improver of the present invention. The component other than the improver in the frying powder is not particularly limited. The component includes, for example, flour, a processed product thereof and decomposed products thereof; a substance used as a thickening stabilizer in the field of food products as mentioned above, and a decomposed product thereof; a starch, a processed product thereof, and decomposed products thereof; and the like. The usual blending amount of the improver of the present invention in the frying powder is the same as that of the above-mentioned (i). When the blending amount is expressed in terms of the polysaccharide powder, the amount is preferably from 0.01 to 10% by weight, and more preferably from 0.1 to 5% by weight. The frying powder of the present invention can be prepared by mixing the improver of the present invention with one or more kinds of the component other than the improver of the present invention mentioned above according to a known method.

The frying powder of the present invention can be used in the form of a batter liquid obtained by mixing the frying powder with a proper amount of water, a powder used for dredging over the surface of a food before the batter liquid is adhered to the food, or the like.

In addition, bread crumb may be used for the deep-fried food as desired in some cases. By containing the improver of the present invention in the bread crumb, the desired effects of the present invention can also be obtained. Therefore, another embodiment of the present invention can also provide bread crumb for a deep-fried food. The content of the improver in the bread crumb cannot be absolutely determined since the content also depends on the amount of the bread crumb used. Usually, the content of the improver is preferably from 0.01 to 10% by weight, and more preferably from 0.1 to 5% by weight as expressed in terms of the polysaccharide powder. The process for producing the bread crumb is not particularly limited. The bread crumb can be produced in accordance with a known process for producing bread crumb by blending the improver of the present invention into a dough for preparation of bread crumb.

The frying powder, the batter liquid, the powder for dredging, and the bread crumb mentioned above according to the present invention can be used alone or in combination of two or more kinds depending upon their purposes. Those may be each used a usual amount in the production of a known deep-fried food.

The deep-fried food in the present invention is not particularly limited, as long as the deep-fried food is cooked by deep-frying in an oil. The deep-fried food includes, for example, fried goods obtained by covering food materials (ingredients) such as vegetables, meat, and fishery products with batter (batter liquid), such as tempura, deep-fried foods, croquettes, cutlets, and deep-fries without batter but simply dipped in seasoned sauce (karaage), nuggets, and the food materials are then subjected to frying; various deep-fried breads such as doughnuts and curry-stuffed deep-fried breads; various deep-fried noodles such as instant noodles, SARA UDON (deep-fried thin udon noodles topped with a seafood and vegetable sauce), Chinese style fried noodles, and longevity noodles; and deep-fried goods such as deep-fried fish paste cake (satsuma-age), deep-fried fish paste cake with squid (ikaten), and deep-fried fish paste cake with burdock root (gobouten). In addition, the deep-fried food of the present invention also includes, for example, chilled or frozen foods such as the above-mentioned deep-fried foods which are microwavable, and the like.

The deep-fried food of the present invention can be produced by directly using the improver of the present invention, or also using a frying powder of the present invention, or batter liquid, or the above-mentioned powder for dredging, bread crumb, or the like as desired, according to a known method for cooking the deep-fried food. The other ingredients to be usually used for producing the deep-fried food of the present invention are not particularly limited, as long as the deep-fried food is cooked using the improver of the present invention.

The deep-fried food of the present invention can be obtained by, for example, covering the surface of a food material such as vegetables, meat, and fishery products, such as tempura, deep-fried foods, croquettes, cutlets, deep-fries without the batter (karaage), nuggets, and the like, with a powder for dredging as desired, adhering a batter liquid thereto, covering the battered food material with bread crumbs as desired, and frying the food material in a known edible fat or oil. Also, as the deep-fried food of the present invention, a deep-fried good, for example, various deep-fried breads such as doughnuts and curry-stuffed deep-fried breads; various deep-fried noodles such as instant noodles, SARA UDON (deep-fried thin udon noodles topped with a seafood and vegetable sauce), Chinese style fried noodles, and longevity noodles; deep-fried foods of fish cakes such as deep-fried fish paste cake (satsuma-age), deep-fried fish paste cake with squid (ikaten), and deep-fried fish paste cake with burdock root (gobouten); or the like can be obtained by kneading the improver of the present invention into the dough of the deep-fried good or into the ground fish (surimi) used as its raw material during mixing and kneading, forming each of the kneaded mixture in various shapes according to a known production method, and frying the resulting deep-frying goods in a known edible fat or oil. A frying food before fry cooking is also encompassed in the present invention. The frying food includes, for example, chilled or frozen foods such as fries precooked to a state that is ready to be fried; and the like.

The process for kneading the improver of the present invention into the dough or the ground fish of the deep-fried good during the production of various deep-fried goods is not particularly limited. The process includes, for example, a process for blending the improver of the present invention, comprising dispersing the improver in water to be used during the preparation of the deep-frying goods; a process for blending the improver of the present invention, comprising adding the improver directly in the form of powder to a raw material powder of the deep-frying good such as flour with mixing; and the like. From the aspect of operating efficiency, the process for blending the improver of the present invention, comprising adding the improver in the form of powder to other raw material powder such as flour with mixing is preferable.

The process for producing the deep-fried food of the present invention is not limited to those exemplified in the present specification. Moreover, the method of use, the use embodiment, the timing of use, or the like of the improver of the present invention is not particularly limited. The desired embodiment can be optionally selected according to the deep-fried food to be obtained.

The deep-fried food of the present invention obtained as mentioned above has a low oil absorption, so that oiliness can be controlled, thereby giving excellent mouthfeel and taste. In addition, for example, when the deep-fried food of the present invention is stored in a refrigerator (4° C.) or a freezer (−4° C.) for a given period of time, and then defrosted, the deep-fried food still provides excellent mouthfeel and taste. There is exhibited such an effect especially in noodles that the noodles are less likely to be softened, or the like.

Next, the present invention will be described more specifically hereinbelow by means of Examples, without intending to limit the present invention only to these Examples.

EXAMPLES

Example 1

Twenty-five kilograms of guar gum (average particle size: 51.35 μm, manufactured by MAYPRO Industries Inc. BU) was formed into fine powders with a freeze pulverizer (manufactured by Hosokawa Micron Corporation) under the conditions of a pulverization temperature of −50° C. and a peripheral speed of a rotor of 73 m/sec, to give 24.9 kg of a guar gum powder having an average particle size of 18.79 μm.

Example 2

Twenty-five kilograms of HM pectin (average particle size: 37.20 μm, manufactured by CP Kelco) was formed into fine powders with a counter jet mill (manufactured by Hosokawa Micron Corporation) under the conditions of a pulverization air flow rate of 5000 m³/hour (20° C., 600 kPa), to give 24.9 kg of an HM pectin powder having an average particle size of 3.33 μm.

Example 3

Twenty-five kilograms of alginic acid (average particle size: 36.33 μm, manufactured by KIMICA Corporation) was formed into fine powders with a freeze pulverizer (manufactured by Hosokawa Micron Corporation) under the conditions of a pulverization temperature of −100° C. and a peripheral speed of a rotor of 73 m/sec, to give 24.8 kg of an alginic acid powder having an average particle size of 18.96 μm.

Test Example 1

Eighty-nine grams of flour (soft flour), 9 g of corn starch, 1 g of baking powder, and 1 g of each of the pulverized products obtained by physical impact of the materials (thickening stabilizers) of Examples 1 to 3 were combined. One-hundred and fifty grams of water was added thereto, and the mixture was mixed while stirring, to prepare a batter liquid. A shell of a prawn was removed, and an intestinal string of the prawn was cut away, the prepared prawn was dipped in the batter liquid, and deep-fried in corn oil at 170° to 175° C. for 2 minutes, to give prawn tempura (inventive products 1 to 3).

In addition, as a comparative product 1, a batter liquid was prepared by adding 1 g of guar gum itself before formation of fine powders (average particle size: 51.35 μm) in place of the pulverized product obtained by physical impact of the thickening stabilizer of Example 1, and prawn tempura was obtained in the same manner.

As a comparative product 2, a batter liquid was prepared by adding 1 g of HM pectin itself before formation of fine powders (average particle size: 37.20 μm) in place of the pulverized product obtained by physical impact of the thickening stabilizer of Example 2, and prawn tempura was obtained in the same manner.

As a comparative product 3, a batter liquid was prepared by adding 1 g of alginic acid itself before formation of fine powders (average particle size: 36.33 μm) in place of the pulverized product obtained by physical impact of the thickening stabilizer of Example 3, and prawn tempura was obtained in the same manner.

As a comparative product 4, a batter liquid was prepared without adding any one of the thickening stabilizers of Examples 1 to 3 or any one of the pulverized products, and prawn tempura was obtained in the same manner.

The oil absorption of the prawn tempura obtained was evaluated by determining the oil content in the batter (% by weight). The lower the oil content in the batter, the lower the oil absorption of the prawn tempura. When 10 minutes passed from frying, the batter of the tempura was removed and the weight of the batter [A (g)] was determined. Thereafter, the batter was dried at 105° C. for 2 hours to remove water therefrom, an oil component was extracted from the dried batter with petroleum ether, and the oil component was filtered and concentrated to determine the amount of oil [B (g)]. The oil content in the batter was obtained from the following formula:

$$\text{Oil content in the batter (\% by weight)} = \frac{B}{A} \times 100$$

In addition, after 24 hours of chilled storage (4° C.), the tempura was heated in a microwave oven at 500 W for 1 minute, and the heated tempura was evaluated by 20 panelists for mouthfeel and taste of the batter and the food material (prawn).

The evaluation results for mouthfeel and taste are shown as an average score of 20 panelists wherein those that are highly excellent are ranked 10 points; those that are notably excellent are ranked 9 points; those that are excellent are ranked 8 points; those that are fair are ranked 7 points; those that are somewhat poor are ranked 6 points; those that are notably poor are ranked 5 points; and those that are very poor are ranked 4 points.

The above results are summarized in Table 1.

TABLE 1

|  | Oil Content in Batter (% by weight) | Mouthfeel | Taste |
| --- | --- | --- | --- |
| Inventive Product 1 | 23.3 | 9.2 | 8.0 |
| Inventive Product 2 | 21.2 | 9.5 | 7.8 |
| Inventive Product 3 | 20.1 | 9.7 | 8.2 |
| Comparative Product 1 | 30.8 | 5.6 | 7.0 |
| Comparative Product 2 | 29.2 | 6.1 | 6.8 |
| Comparative Product 3 | 27.5 | 6.3 | 7.2 |
| Comparative Product 4 | 33.7 | 5.1 | 6.4 |

As is evident from the results of Table 1, it can be seen that each of the inventive products 1 to 3 has a low oil content in the batter, as compared to the comparative products 1 to 4, and the prawn tempura accordingly has a low oil absorption. Moreover, it can be seen that each of the inventive products 1 to 3 has an excellent mouthfeel and also has an excellent taste, as compared to the comparative products 1 to 4. Especially, it can be seen that the inventive products 2 and 3 using the pulverized products obtained by physical impact of pectin of Example 2 and alginic acid of Example 3 have a low oil absorption of the prawn tempura, and also have excellent mouthfeel and taste.

Test Example 2

Thirty grams of butter and 30 g of a powder sugar were combined and kneaded well into a creamy state. Thereto was added a mixture of 50 g of a whole egg liquid and 50 g of cow's milk little by little, and the mixture was mixed. The resulting mixture, 200 g of flour (soft flour), 8 g of baking powder, and 2 g of the pulverized product obtained by physical impact of the thickening stabilizer of each of Examples 1 to 3 were placed in a mixer, and the ingredients were mixed for 3 minutes. The resulting dough was set aside for 10 minutes while keeping the resulting dough from being dried, and the dough was formed into a doughnut shape having an inner diameter of 4 cm, an outer diameter of 6 cm, and a height of 0.9 cm. Next, the doughnut-shaped dough was deep-fried in palm oil at about 180° C. for 3 minutes, to give each of doughnuts (inventive products 4 to 6).

In addition, as a comparative product 5, the same procedures were carried out except that 2 g of guar gum itself before formation of fine powders (average particle size: 51.35 μm) was added in place of the pulverized product obtained by physical impact of the thickening stabilizer of Example 1, to give a doughnut.

As a comparative product 6, the same procedures were carried out except that 2 g of HM pectin itself before formation of fine powders (average particle size: 37.20 μm) was added in place of the pulverized product obtained by physical impact of the thickening stabilizer of Example 2, to give a doughnut.

As a comparative product 7, the same procedures were carried out except that any one of the thickening stabilizers of Examples 1 to 3 or any one of the pulverized products were not added, and that 2 g of an emulsifying agent in a liquid crystal state [prepared by gradually adding a powder of glycerol monostearate (manufactured by Taiyo Kagaku Co., Ltd., product name: SUNSOFT No. 8000) to the same amount of water at 65° C. or so] was added, to give a doughnut.

The oil absorption of the resulting doughnut was evaluated by determining the oil content in the dough. The lower the oil content in the dough, the lower the oil absorption of the doughnut. The oil content in the dough was obtained according to the method of obtaining the oil content in the batter of Test Example 1.

In addition, the doughnut was evaluated by 20 panelists for mouthfeel and taste.

The evaluation results for mouthfeel and taste are shown as an average score of 20 panelists wherein those that are highly excellent are ranked 10 points; those that are notably excellent are ranked 9 points; those that are excellent are ranked 8 points; those that are fair are ranked 7 points; those that are somewhat poor are ranked 6 points; those that are notably poor are ranked 5 points; and those that are very poor are ranked 4 points.

The above results are summarized in Table 2.

TABLE 2

|  | Oil Content in Dough (% by weight) | Mouthfeel | Taste |
| --- | --- | --- | --- |
| Inventive Product 4 | 14.5 | 9.3 | 7.7 |
| Inventive Product 5 | 13.7 | 10.0 | 8.3 |
| Inventive Product 6 | 14.1 | 9.0 | 7.5 |
| Comparative Product 5 | 22.3 | 5.7 | 7.0 |
| Comparative Product 6 | 21.6 | 6.0 | 6.8 |
| Comparative Product 7 | 18.9 | 7.3 | 4.5 |

As is evident from the results of Table 2, it can be seen that any one of the inventive products 4 to 6 have a low oil content in the dough, as compared to the comparative products 5 to 7, and the doughnut accordingly has a low oil absorption. Moreover, it can be seen that any one of the inventive products 4 to 6 have an excellent mouthfeel and also have an excellent taste, as compared to the comparative products 5 to 7.

Example 4

Twenty-five kilograms of potato starch (average particle size: 56.98 μm, manufactured by Naka-Shari Starch Factory of Shari Agricultural Cooperative Association) was formed into fine powders with a freeze pulverizer (manufactured by Hosokawa Micron Corporation) under the conditions of a pulverization temperature of −100° C. and a peripheral speed of a rotor of 73 m/sec, to give 24.9 kg of a potato starch powder having an average particle size of 18.19 μm.

Example 5

Twenty-five kilograms of heat-processed corn starch (average particle size: 74.42 μm, manufactured by NIHON SHOKUHIN KAKO CO., LTD.) was formed into fine powders with a counter jet mill (manufactured by Hosokawa Micron Corporation) under the conditions of a pulverization air flow rate of 5000 m³/hour (20° C., 600 kPa), to give 24.9 kg of a corn starch powder having an average particle size of 3.41 μm.

Test Example 3

Twenty grams of each of the pulverized products obtained by physical impact of each of the starches of Examples 4 and 5, 0.8 g of sodium carbonate as brine, 1.2 g of potassium carbonate, 1.0 g of trisodium phosphate, 15 g of table salt, and 350 g of water were combined with a mixture of 850 g of plain flour and 150 g of tapioca. The combined mixture was mixed with a mixer for 15 minutes while kneading, and the kneaded mixture was rolled and cut out (cutter No. 20 edge, width of noodle strand: 1.0 mm) by a conventional method, to give noodles. The resulting noodles were steamed with a steamer for 2 minutes, the steamed noodles were seasoned, and thereafter the noodles were set in a molding box and deep-fried in palm oil at 150° C. and dried for 1.5 minutes, to give instant Chinese noodles (deep-fried noodles) (inventive products 7 and 8).

In addition, as a comparative product 8, the same procedures were carried out except that 20 g of potato starch itself before formation of fine powders (average particle size: 56.98 μm) was added in place of the pulverized product obtained by physical impact of the starch of Example 4, to give instant Chinese noodles (deep-fried noodles).

As a comparative product 9, the same procedures were carried out except that 20 g of the processed corn starch before formation of fine powders (average particle size: 74.42 μm) was added in place of the pulverized product obtained by physical impact of the starch of Example 5, to give instant Chinese noodles (deep-fried noodles).

As a comparative product 10, the same procedures were carried out except that any one of the starches and any one of the pulverized products of Examples 4 and 5 were not added, to give instant noodles (deep-fried noodles).

The oil absorption of the resulting instant Chinese noodles (deep-fried noodles) was evaluated by determining the oil content in the noodles. The lower the oil content in the noodles, the lower the oil absorption of the instant Chinese noodles (deep-fried noodles). The oil content in the noodles was obtained according to the method of obtaining the oil content in the batter of Test Example 1.

In addition, the resulting instant Chinese noodles (deep-fried noodles) was placed in a vessel made of polystyrol, and 300 mL of hot water was poured into the vessel. The noodles were evaluated by 20 panelists for mouthfeel, suppression of flaccidity of noodles, and taste after a lapse of 3 minutes.

The evaluation results for mouthfeel, suppression of flaccidity of noodles, and taste are shown as an average score of 20 panelists wherein those that are highly excellent are ranked 10 points; those that are notably excellent are ranked 9 points; those that are excellent are ranked 8 points; those that are fair are ranked 7 points; those that are somewhat poor are ranked 6 points; those that are notably poor are ranked 5 points; and those that are very poor are ranked 4 points.

The above results are summarized in Table 3.

TABLE 3

|  | Oil Content in Noodles (% by weight) | Mouth-feel | Suppression of Flaccidity of Noodles | Taste |
| --- | --- | --- | --- | --- |
| Inventive Product 7 | 19.5 | 9.7 | 9.5 | 7.7 |
| Inventive Product 8 | 20.4 | 9.8 | 9.0 | 8.0 |
| Comparative Product 8 | 28.1 | 5.5 | 5.3 | 7.2 |
| Comparative Product 9 | 27.8 | 6.0 | 5.7 | 6.5 |
| Comparative Product 10 | 27.5 | 4.7 | 4.5 | 7.0 |

As is evident from the results of Table 3, it can be seen that both the inventive products 7 and 8 have a low oil content in the noodles, as compared to the comparative products 8 to 10, and the instant Chinese noodles (deep-fried noodles) accordingly has a low oil absorption. Moreover, it can be seen that the inventive products 7 and 8 have an excellent mouthfeel, are capable of suppressing flaccidity of noodles and also have an excellent taste, as compared to the comparative products 8 to 10.

Test Example 4

Twenty-five grams of an yeast, 1 g of an yeast food, and 400 g of water were combined with 700 g of strong flour, and the ingredients were mixed and kneaded with a mixer for 5 minutes. Thereafter, the mixture was fermented for 4 hours, to give a sponge dough. Five grams of each of the pulverized products obtained by physical impact of the thickening stabilizers of Examples 1 to 3 were mixed with 300 g of strong flour, 30 g of sugar, 20 g of table salt, 20 g of skim milk powder, 50 g of shortening, and 260 g of water, and the mixture was mixed and kneaded with the sponge dough with a mixer for 15 minutes. Thereafter, the mixed dough was divided into 430 g portions, the divided portions were placed in a mold and subjected to final proof at 38° C. for 50 minutes. Thereafter, the dough was baked at 200° C. for 40 minutes, and the baked dough was cooled for 1 hour at room temperature, to give a one-loaf bread. The bread was then pulverized with a power mill (manufactured by K.K. Showa Kagaku Kikai Kosakusho), and thereafter the pulverized bread was dried with a hot air dryer until water in the bread was reduced to 10% or less, to give bread crumbs. Eighty-five grams of starch, 7 g of a whole egg powder, 5 g of an α-starch, and 2.5 g of powdered fat or oil were combined, and thereto was added 200 g of water, and the ingredients were mixed while stirring, to give a batter liquid. Potatoes were steamed, and thereafter the steamed potatoes were mashed to rounded into a potato paste. The rounded potato paste was dipped in the batter liquid, and the battered potato was covered with the bread crumbs. Thereafter, the potato paste coated with the bread crumbs was deep-fried in corn oil at 175° to 180° C. for 5 minutes, to give a croquette (inventive products 9 to 11).

In addition, as a comparative product 11, the bread crumbs were produced in the same manner except that 5 g of guar gum itself before formation of fine powders (average particle size: 51.35 μm) was added in place of the pulverized product obtained by physical impact of the thickening stabilizer of Example 1, to give a croquette in the same manner.

In addition, as a comparative product 12, the bread crumbs were produced in the same manner except that 5 g of pectin itself before formation of fine powders (average particle size: 37.20 μm) was added in place of the pulverized product obtained by physical impact of the thickening stabilizer of Example 2, to give a croquette in the same manner.

In addition, as a comparative product 13, the bread crumbs were produced in the same manner except that 5 g of alginic acid itself before formation of fine powders (average particle size: 36.33 μm) was added in place of the pulverized product obtained by physical impact of the thickening stabilizer of Example 3, to give a croquette in the same manner.

In addition, as a comparative product 14, the bread crumbs were produced without adding any one of the thickening stabilizers of Examples 1 to 3 or any one of the pulverized products, to give a croquette in the same manner.

The oil absorption of the resulting croquette was evaluated by determining the oil content in the batter (% by weight). The lower the oil content in the batter, the lower the oil absorption of the croquette. The oil content in the batter was obtained according to the method of obtaining the oil content in the batter of Test Example 1.

In addition, after storage at 4° C. of 24 hours, the croquette was heated in a microwave oven at 500 W for 1 minute, and the heated croquette was evaluated by 20 panelists for mouthfeel and taste.

The evaluation results for mouthfeel and taste are shown as an average score of 20 panelists wherein those that are highly excellent are ranked 10 points; those that are notably excellent are ranked 9 points; those that are excellent are ranked 8 points; those that are fair are ranked 7 points; those that are somewhat poor are ranked 6 points; those that are notably poor are ranked 5 points; and those that are very poor are ranked 4 points.

The above results are summarized in Table 4.

TABLE 4

|  | Oil Content in Batter (% by weight) | Mouthfeel | Taste |
| --- | --- | --- | --- |
| Inventive Product 9 | 34.5 | 8.8 | 8.1 |
| Inventive Product 10 | 32.4 | 9.2 | 8.3 |
| Inventive Product 11 | 30.8 | 9.6 | 8.4 |

TABLE 4-continued

|  | Oil Content in Batter (% by weight) | Mouthfeel | Taste |
| --- | --- | --- | --- |
| Comparative Product 11 | 40.5 | 6.0 | 6.8 |
| Comparative Product 12 | 38.9 | 6.5 | 7.2 |
| Comparative Product 13 | 37.1 | 6.8 | 7.4 |
| Comparative Product 14 | 42.3 | 5.3 | 6.4 |

As is evident from the results of Table 4, it can be seen that each of the inventive products 9 to 11 has a low oil content in the batter, as compared to the comparative products 11 to 14, and the croquette accordingly has a low oil absorption. Moreover, it can be seen that each of the inventive products 9 to 11 has an excellent mouthfeel, and also has an excellent taste, as compared to the comparative products 11 to 14. Among them, it can be seen that the inventive products 10 and 11 using the pulverized products obtained by physical impact of pectin of Example 2 and alginic acid of Example 3 have a low oil absorption of the croquette, and also have excellent mouthfeel and taste.

INDUSTRIAL APPLICABILITY

The present invention provides a quality improver for a deep-fried food, capable of controlling an oil absorption of the deep-fried food during cooking, thereby making it possible to provide a deep-fried food having excellent mouthfeel and taste without being oily; a frying powder and a frying food, each comprising the improver; and a deep-fried food prepared by cooking using the improver or the frying powder. Therefore, the present invention contributes to the field of foods.

The invention claimed is:

1. A composition for a deep-fried food, comprising:
a polysaccharide powder having an average particle size of 20 μm or less, wherein the polysaccharide is selected from the group consisting of guar gum, pectin, xanthane gum, alginic acid and carboxymethyl cellulose, and the polysaccharide powder is obtained by subjecting the polysaccharide to jet pulverization or freeze pulverization,
wherein the composition imparts to deep fried food, reduced oil absorption, increased mouthfeel and increased taste as compared to a composition comprising a polysaccharide powder having an average particle size of more than 20 μm and not being subjected to jet pulverization or freeze pulverization.

2. The composition according to claim 1, wherein the polysaccharide is alginic acid, pectin or a combination of alginic acid and pectin.

3. A frying powder comprising the composition as defined in claim 1.

4. A deep-fried food prepared by cooking using composition as defined in claim 1, or the frying powder as defined in claim 3.

5. A frying food comprising the composition as defined in claim 1.

6. The composition according to claim 1, wherein the average particle size of the polysaccharide powder is 15 μm or less.

7. The composition according to claim 1, wherein the average particle size of the polysaccharide powder is 10 μm or less.

8. The composition according to claim 1, wherein the average particle size of the polysaccharide powder is from 1 to 15 µm.

9. The composition according to claim 1, wherein the average particle size of the polysaccharide powder is from 1 to 10 µm.

10. The composition according to claim 1, wherein the polysaccharide is selected from the group consisting of guar gum, pectin, xanthane gum and carboxymethyl cellulose.

11. The composition according to claim 1, wherein the polysaccharide is selected from the group consisting of guar gum, pectin and alginic acid.

12. The composition according to claim 1, wherein the composition imparts to the deep-fried food, oil absorption that is lower by at least approximately 14.8% as compared to a composition comprising a polysaccharide powder having an average particle size of more than 20 µm and not being subjected to jet pulverization or freeze pulverization.

13. The composition according to claim 1, wherein the composition imparts to the deep-fried food, oil absorption that is lower by approximately 14.8-36.6% as compared to a composition comprising a polysaccharide powder having an average particle size of more than 20 µm and not being subjected to jet pulverization or freeze pulverization.

14. The composition for a deep-fried food according to claim 1, consisting essentially of:
   a polysaccharide powder having an average particle size of 20 µm or less, wherein the polysaccharide is selected from the group consisting of guar gum, pectin, xanthane gum, alginic acid and carboxymethyl cellulose, and the polysaccharide powder is obtained by subjecting the polysaccharide to jet pulverization or freeze pulverization; and
   at least one component, wherein the at least one component is selected from the group consisting of egg white, egg white hydrolysates, egg yolk, egg yolk hydrolystes, chicken egg (whole egg), chicken egg hydrolysates, whey protein, wheat protein, gliadin, fatty acid esters of glycerol, enzymatically decomposed lecithin, a powdered animal fat or oil and a powdered vegetable fat or oil,
   wherein the composition imparts to the deep-fried food, reduced oil absorption, increased mouthfeel and increased taste as compared to a composition comprising a polysaccharide powder having an average particle size of more than 20 µm and not being subjected to jet pulverization or freeze pulverization.

* * * * *